United States Patent [19]

Lukkarila et al.

[11] 4,068,847
[45] Jan. 17, 1978

[54] CHROMA AND LUMINANCE SIGNAL GENERATOR FOR VIDEO GAMES

[75] Inventors: Jeffrey Reed Lukkarila; Kenneth D. Liston, Jr., both of Fort Wayne, Ind.

[73] Assignee: The Magnavox Company, Fort Wayne, Ind.

[21] Appl. No.: 699,127

[22] Filed: June 23, 1976

[51] Int. Cl.² .............................................. A63F 7/06
[52] U.S. Cl. ......................... 273/85 R; 273/DIG. 28; 358/22
[58] Field of Search .............................. 358/1, 22, 81; 340/324 AD; 273/DIG. 28, 85

[56] References Cited

U.S. PATENT DOCUMENTS

Re. 28,598  10/1975  Baer et al. .................... 340/324 AD
3,748,377   7/1973   Bruinsma ............................. 358/22

OTHER PUBLICATIONS

Walker, "Games," Electronics—June 24, 1976, pp. 93–94.
"IC Application of the Month," Radio Electronics—Jan. 1977, p. 65.

Primary Examiner—Howard W. Britton
Assistant Examiner—Mitchell Saffian

[57] ABSTRACT

Apparatus is described for generating simultaneously luminance and chroma signals in a video game for use with a standard NTSC television receiver. Game object color can be changed on the occurrence of a game event. Independent control over the brightness and hue for each marker is provided.

7 Claims, 2 Drawing Figures

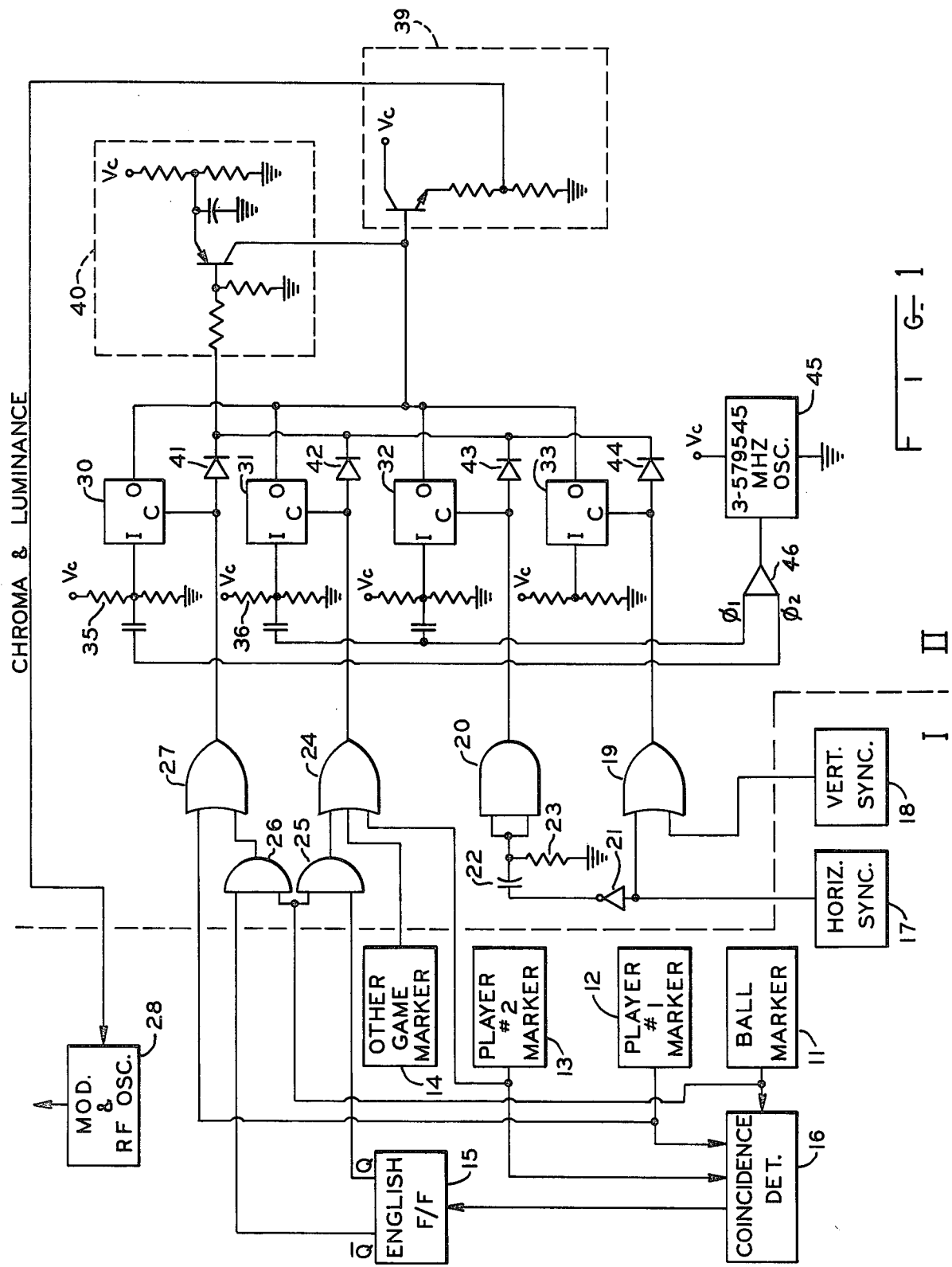

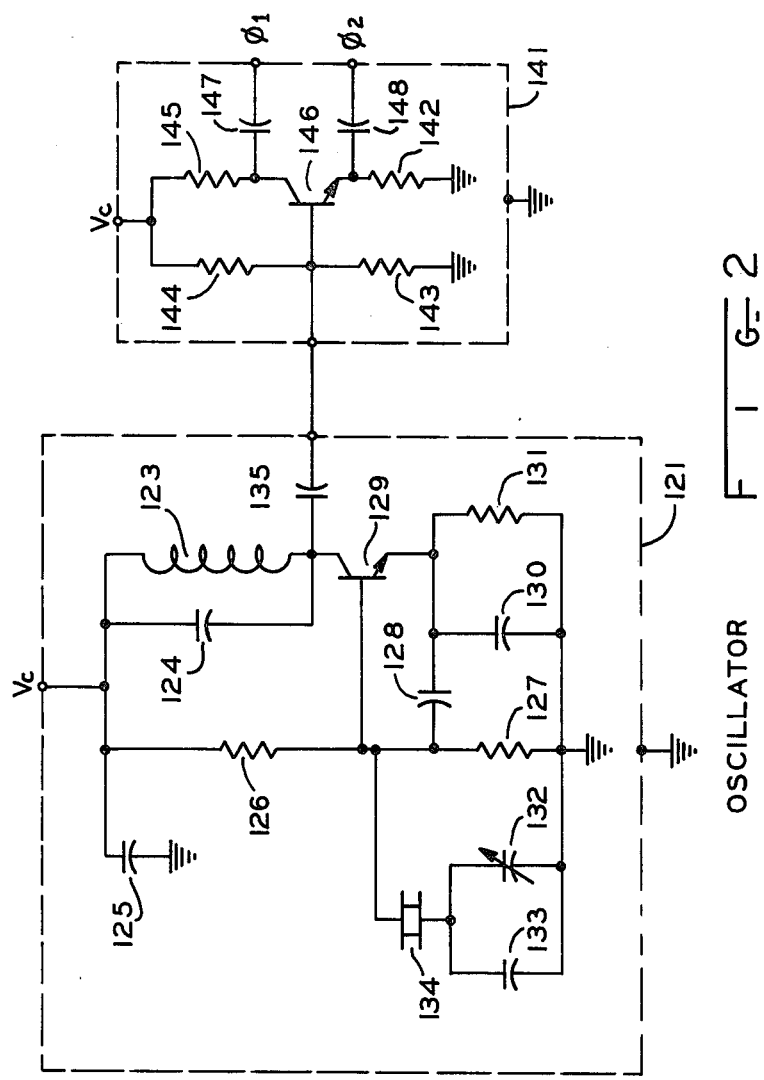

CHROMA AND LUMINANCE SIGNAL GENERATOR FOR VIDEO GAMES

BACKGROUND OF THE INVENTION

This invention relates to video game apparatus. Specifically, apparatus is described for producing game markers displayed on a color television receiver.

Apparatus for supplying signals to a television receiver for displaying markers which may be manipulated to play simulated games of ping pong, tennis, or hockey are well known in the art and described in U.S. Pat. No. 3,659,285 by Rusch, Harrison, and Baer, and U.S. Pat. No. 3,659,284 by Rusch, hereby incorporated by reference. The game markers simulate player positions and game objects, and the players have player operable controls for moving the player position markers so as to intercept a game marker.

The apparatus described by these references provide a means for generating a luminance signal containing position and geometry information for each game marker to be displayed. The luminance signal of each game marker is combined with a vertical and horizontal sync signal. The resulting signal is used to modulate an R. F. signal in the receiver passband, and the modulated signal is applied to the antenna terminals of a standard television receiver. The television receiver when tuned to the R. F. signal frequency will display the game markers.

The references also describe a means for providing color to the game markers displayed on the television receiver. Color information is supplied by a chroma signal derived by pulsing a 3.579545 MHz signal according to the format of a game marker luminance signal. The phase of the resulting pulses of 3.579545 MHz signal is compared to the phase of a reference "burst" signal supplied by the video game with synchronous detectors in the television receiver. The video game produces the burst signal by pulsing the 3.579545 MHz signal with a delayed horizontal sync pulse.

The chroma signal produced by the video game apparatus is added to the luminance signals and sync signals, and the resulting composite signal is used to modulate the R. F. signal. By adding the chroma signal to the luminance signal, some problems of registration are produced when the delay experienced by chroma and luminance signals are not identical. Therefore, it is desirable to produce these signals simultaneously rather than combining separately produced luminance and chroma signals.

SUMMARY OF THE INVENTION

Accordingly, it is an object of this invention to provide improved color registration to game markers in a video game.

It is a further object of this invention to change the color of a game marker during the playing of a game.

In accordance with the invention, apparatus is provided for simultaneously producing both luminance and chroma signals for displaying video game markers. Different markers may be displayed in different colors, or the color of a marker can be made to change on the occurrence of a game event. A reference burst signal is also produced by the apparatus. The chroma signal for each game marker is produced by a switching means enabled by a marker generator output signal. Connected to the input of the switching means is a signal at 3.579545 MHz, and a d.c. voltage. A luminance and chroma signal are produced at the output of the switching means for modulating an R. F. signal. The luminance level may be controlled by changing the magnitude of the d.c. voltage at the input of the switching means. Color is determined by the phase of the 3.579545 MHz signal with respect to the generated burst signal.

DESCRIPTION OF THE FIGURES

FIG. 1 is an overall block diagram representation of the invention incorporated in a well-known video game.

FIG. 2 is a schematic diagram showing in detail the circuitry of Block 11 and Block 12 of FIG. 1.

DESCRIPTION OF THE PREFERRED EMBODIMENT

Referring now to FIG. 1, the apparatus of this invention is shown incorporated with a well-known video game described in detail in the aforementioned U.S. Pat. Nos. 3,659,284 and 3,659,285. Section I of FIG. 1 shows known circuit components for providing a signal containing game marker information. A plurality of marker generators 11–14 provide video signals referenced to horizontal and vertical sync signals. The time relationship of a marker generator signal with respect to the horizontal and vertical sync signals determines the position and geometry of displayed game markers. Means for generating game markers representing player positions and game objects which move are also shown in the aforementioned patents.

The aforementioned reference patents combine the individual signals produced by marker generators 11–14 by means of an OR gate. A summer combines the output of the OR gate with the horizontal and vertical sync pulses. The resulting composite video signal or luminance signal is used to modulate an R. F. signal having a frequency in the passband of a television receiver. The apparatus shown in these references contains a coincidence detector 16 for changing the direction of game or ball marker travel when a player successfully intercepts the ball marker. An "English" flip flop 15 is also shown in the references which gives the ability to control the ball marker vertical position to the player who successfully intercepts the ball marker. The output of the English flip flop 15 indicates which player has successfully intercepted the ball marker.

In order to provide color information for causing game markers to be displayed in color, a second signal or chroma signal must be added to the luminance signal produced by the game marker generators. This invention provides both luminance and chroma signals from the signals produced by the game marker generators of the aforementioned references.

The game marker generators 11–14 supply pulses directly to the control input of a plurality of switching means 30, 31 through OR gates 24 and 27. This causes the switching means 30, 31 to be activated in response to the marker generator pulses.

The input to the switching means 30, 31 is supplied with a d.c. voltage established by voltage dividers 35 and 36, and with a signal having a frequency of 3.579545 MHz. Two resistors forming voltage divider 35, and two resistors forming voltage divider 36 establish the luminance level for the game marker associated with each respective switching means 30, 31. By activating the switching means in response to a game marker generator signal, the output of the switching means will provide both chroma and luminance information for identifying the position, geometry, and color of a particular game marker. The output of each switching means 30, 31 is connected to an emitter follower amplifier 39. A clamp circuit 40 is shown for clamping the output of the emitter follower 39 to a constant d.c. level when the output of the game object marker generators 30–32 is zero indicating no marker information is to be displayed. Diodes 41–43 couple the control input of the switching means 30–32 to the clamping circuit 40 input. The action of the diodes 41–43 is such that when the control input of a switch is not activated, the clamping circuit 40 will clamp the output of the emitter follower amplifier 39 at a constant d.c. voltage providing a background luminance signal to the subsequent video game circuitry. The background luminance may be changed by altering the level of the d.c. voltage provided by the emitter follower 39. By providing a phase difference between signals applied to the input of each switching means 30, 31, the color generated by each is different. The switching means shown may be "Quad gates" such as Motorola MM5616A or equivalent.

The luminance and chroma signal are supplied to a modulator-R. F. oscillator 28 in the video game. The modulator-R. F. oscillator 28 frequency translates the chroma and luminance signals to a frequency within the passband of the television receiver. When presented to the terminals of a standard NTSC television receiver, the chroma and luminance information for the game marker will be processed by the receiver and the game marker will be displayed in color. R. F. oscillators and modulators suitable for frequency translating the chroma and luminance signals are known in the art.

A color burst reference signal must be provided in order for the television receiver to properly demodulate the chroma signal. Another switching means 32 is used to gate the 3.579545 MHz signal to the modulator-R. F. oscillator 28 in response to a delayed horizontal sync pulse. The horizontal sync pulse is applied through an inverter circuit 21 to a capacitor 22. The remaining capacitor lead is connected to a resistor 23 and to the inputs of a conventional AND gate 20. The remaining end of the resistor 23 is grounded. The action of the inverter 21, capacitor 22, resistor 23, and AND gate 20 is such that when a negative horizontal sync pulse is provided to the input of the inverter circuit 21, the trailing edge of the sync pulse will cause switching means 32 to be activated. The activation of switching means 32 will cause a momentary burst of 3.579545 MHz signal to be gated to the output of the emitter follower amplifier 39. As in a standard NTSC color transmission, the burst occurs just after the horizontal sync pulse interval. The modulator-R. F. oscillator 28 will supply the burst signal to the television receiver for establishing a color reference for demodulating color signals.

A novel feature of this invention is that a game marker may be caused to change color on the occurrence of a game event. With the invention as shown in this embodiment, the color of the game object, i.e. ball, may be changed when a player successfully moves a player marker into coincidence with the ball marker. By using the output of the English flip flop 15 to steer the ball marker video to either switching means 30, or switching means 31, the ball marker color may be made to change. OR gates 27 and 24 have marker generator output signals supplied directly to an input of each. The remaining inputs to OR gates 24, 27 are connected to the output of the two AND gates 25 and 26. The remaining inputs to AND gates 25 and 26 are connected to the Q and $\overline{Q}$ outputs of the English flip flop 15. In this manner, when the English flip flop 15 changes state, indicating that a player has successfully intercepted a ball marker, the ball marker generator will activate a different switching means. Since the color produced by each switching means 30, 31 is different due to the phase difference of the input signals to each switching means, the color of the ball marker will change.

An additional switching means 33 is used to couple both horizontal and vertical sync to the modulator R. F. oscillator 28. Another OR gate 19 has inputs connected to the vertical sync generator 17 and horizontal sync generator 18. The output of the OR gate 19 is connected to the control input of a switching means 33. The switching means 33 has a d.c. voltage connected to the input. When either sync pulse is generated, the OR gate 19 will cause switching means 33 to produce a d.c. pulse which will provide sync information to the signal transmitted to the television receiver.

The embodiment shown contemplates the use of two colors for identifying game markers. A 3.579545 MHz signal generated by an oscillator 45 provides a signal which is split into two signals by phase splitting means 46 having a phase difference of 180°. More colors for identifying even more game markers may be utilized by providing additional switches and additional 3.579545 MHZ signals having different phase relationships.

The phase splitter 46 shown provides only two signals, each having a different phase. Where additional colors are to be generated, a phase splitter having additional outputs at different phases is required. Such phase splitters are well known to those skilled in the art.

An oscillator 121 and phase shifter means 141 for providing two 3.579545 MHz signals having a phase difference is shown in FIG. 2. The oscillator 121 shown is a crystal controlled oscillator of a type well known in the art. The stability of the oscillator 121 has been shown to be adequate for generating chroma signals in registration with the luminance signal. Other means for generating 3.579545 MHz signals will be apparent to those skilled in the art. Further, it is possible as known to those skilled in the art, to divide the oscillator 121 frequency by 3.5 and by 65 (i.e. by 227.5) to derive a horizontal sync signal. By providing a horizontal sync signal from the 3.579545 MHz oscillator, an improved chroma and luminance signal may be realized.

The following are circuit components which may be readily procured and implemented to produce the oscillator and phase shifter means 141 shown in FIG. 2.

| | |
|---|---|
| 123. 18uh inductor | 133. 6.8 P.F. capacitor |
| 124. 100 P.F. capacitor | 134. 3.579545 MHz crystal |
| 125. .001 ufd capacitor | 135. .001 ufd capacitors |
| 126. 68K ohms resistor | 142. 2.2k ohm resistor |
| 127. 33k ohm resistor | 143. 22k ohm resistor |
| 128. 390 P.F. capacitor | 144. 39k ohm resistor |
| 129. 142NI0 transistor | 145. 2.2k ohm resistor |
| 130. 100 P.F. capacitor | 146. 142NIO transistor |
| 131. 47k ohm resistor | 147. .001 ufd capacitor |
| 132. 3–15 P.F. capacitor | 148. .001 ufd capacitor |

Thus there is described with respect to a presently preferred embodiment, an apparatus for providing both chroma and luminance information for game markers in a video game. The specific circuitry and components shown are illustrative only of the invention determined more particularly by the claims that follow.

What is claimed is:

1. In a video game, having a game marker generator for generating a video signal for representing a game marker to be displayed on a television receiver, a luminance and chroma signal generator comprising:
   a. an oscillator means having a signal at a frequency of substantially 3.579545 MHz;
   b. means for combining said oscillator signal with a d.c. voltage, said d.c. voltage representing a luminance level; and
   c. means for switching said combined oscillator signal and d.c. voltage combination in response to said video signal whereby said switched signal comprises a chroma and luminance signal.

2. In a video game wherein a plurality of game markers are represented by a plurality of video signals referenced to vertical and horizontal sync pulses, a circuit for providing chroma and luminance signals for each game marker comprising:
   a. a 3.579545 MHz oscillator having a plurality of output signals, each of said output signals having a different phase;
   b. means for combining a d.c. voltage with each of said output signals to provide a plurality of combined signals whereby said d.c. voltage establishes the luminance level and said output signal establishes the color of a game marker; and
   c. means for switching each of said combined signals in response to each of said video signals, whereby each of said switched signals comprises a chroma and luminance signal for each of said video signals.

3. The apparatus of claim 2 further comprising means for generating a burst signal in response to a delayed horizontal sync signal.

4. The apparatus of claim 1 further comprising means for selectably changing the phase of said combined signal whereby the color of said game marker is changed.

5. The apparatus of claim 3 wherein said means for generating a burst signal comprises a switching means for receiving the combination of a substantially 3.579545 MHz signal and d.c. voltage, said switching means being activated by a delayed sync pulse.

6. In a video game having at least one game marker generator, said game marker generator producing a video signal for determining the location and geometry of a game marker, a chroma and luminance signal generator comprising:
   a. means for generating a plurality of signals having a frequency of 3.579545 MHz, each of said signals having a different phase;
   b. means for combining each of said signals with a d.c. voltage;
   c. a plurality of switches for controlling each of said oscillator signals having a d.c. voltage associated therewith; and
   d. means for selectively applying said video signal to one of said switches whereby said switch is activated in response to said video signal.

7. The apparatus of claim 6 whereby said means for selectively activating one of said gates is controlled by the occurrence of a game event whereby the color of said game marker changes in response to said game event.

* * * * *